United States Patent [19]

Masaki et al.

[11] Patent Number: 4,569,574
[45] Date of Patent: Feb. 11, 1986

[54] OPTICAL MODULATION DEVICE WITH MASKING STRUCTURE AND METHOD OF DRIVING THE SAME

[75] Inventors: Yuichi Masaki, Kawasaki; Yoshio Hotta, Atsugi, both of Japan

[73] Assignee: Canon Kabushiki Kaisha, Tokyo, Japan

[21] Appl. No.: 569,024

[22] Filed: Jan. 9, 1984

[30] Foreign Application Priority Data

Jan. 18, 1983 [JP] Japan ................................ 58-6057

[51] Int. Cl.⁴ ................................................ G02F 1/13
[52] U.S. Cl. ........................... 350/334; 350/339 R; 350/333; 350/336
[58] Field of Search .................... 350/339 R, 333, 334

[56] References Cited

U.S. PATENT DOCUMENTS

| | | | |
|---|---|---|---|
| 4,068,927 | 1/1978 | White | 350/339 R X |
| 4,334,734 | 6/1982 | Hareng et al. | 350/331 R |
| 4,386,836 | 6/1983 | Aoki et al. | 350/331 R |
| 4,487,481 | 12/1984 | Suzawa | 350/345 |

FOREIGN PATENT DOCUMENTS

2912467  10/1980  Fed. Rep. of Germany ... 350/339 R

*Primary Examiner*—John K. Corbin
*Assistant Examiner*—Richard F. Gallivan
*Attorney, Agent, or Firm*—Fitzpatrick, Cella, Harper & Scinto

[57] ABSTRACT

An optical modulation device driven in a time-sharing manner comprises pluralities of signal and row electrodes oppositely spaced from each other, and a liquid crystal interposed between signal and row electrodes, wherein at least one of electrode the plates is provided with a metallic light shielding mask on an electrode provided in a section except for the section serving as a shutter opening, and in that a colored insulating film is provided between row electrodes.

27 Claims, 7 Drawing Figures

OPTICAL MODULATION DEVICE WITH MASKING STRUCTURE AND METHOD OF DRIVING THE SAME

BACKGROUND OF THE INVENTION

1. Field of the Invention

The present invention relates to an optical modulation device, and more particularly to a liquid crystal-optical shutter. Specifically, the present invention relates to a liquid crystal-optical shutter suitable for a time-sharing driving method.

2. Description of the Prior Art

Liquid crystal-optical shutters utilize the electro-optical modulation function of liquid crystals, wherein light is irradiated to modulation cells arranged in the form of an array, thereby to form optical signals corresponding to electrical image signals by selectively outputting transmitted light therethrough. These optical signals are irradiated to e.g. a photosensitive member to obtain a digital copy.

Advantages obtained with a liquid crystal-optical shutter array are as follows.

(1) When applied to an electrophotographic printer, the printer becomes small in apparatus size.

(2) There is no mechanically movable parts such as a polygon scanner used in an LBP (Laser Beam Printer), resulting in no noise and little requirement for strict mechanical precision.

The fact that a liquid crystal shutter array can offer these advantages leads to the possibility of improved reliability, light weight and reduced cost. However, there practically exist various difficulties.

Figure 1:
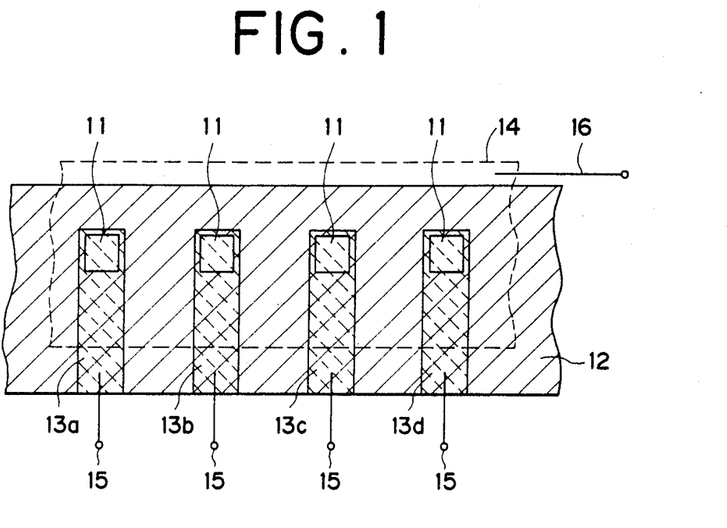
FIG. 1 is a plan view illustrating a prior art liquid crystal-optical shutter.

Referring to FIG. 1, there is shown an example of a crystal shutter array which would be most easily understood.

As shown in FIG. 1, there are provided openings 11 of the shutter, and the remaining parts except for openings are usually masked so that leakage light is not produced. Liquid crystals are hermetically disposed between signal electrodes 13 (13a, 13b, 13c, 13d . . . ) provided at the inner wall surface of an electrode plate 12 and common electrodes 14 disposed opposite to signal electrodes 13. Lead wires 15 and a lead wire 16 are drawn out from electrodes 12 and 13, respectively, and are connected to a shutter array driving circuit (not shown).

However, if the openings are aligned in a manner shown in FIG. 1 and an attempt is made to design a shutter array having a denisty of the picture elements for forming images of 10 dots/mm and a length corresponding to the width of paper size A4, about 2,000 signal electrodes are required. Accordingly, about 2,000 drivers each required for driving a signal electrode are required.

This means that 40 integrated circuit (IC) chips for drivers are required when IC chips each having 50 pins are used, giving rise to serious obstacle to reduction in cost.

For this reason, another attempt is proposed to divide a common electrode into a plurality of row electrodes. Thus, the plurality of row electrodes are so arranged as to form a matrix in combination with signal electrodes. With respect to each row of the common electrode, the opening and closing operation of a shutter is effected by making use of a time-sharing method. However, when using such a liquid crystal shutter array, there is a possibility that light is transmitted not only through a shutter of the row electrode at which the opening and closing operation of the shutter is effected, but also through another shutter of row electrodes placed in shutter off condition, thus failing to obtain high performance. Particularly, the gaps formed between the common electrodes on the common electrode plate for driving a liquid crystal shutter in a time-sharing manner cause a drawback in structural point of view that light leaks therethrough.

SUMMARY OF THE INVENTION

An object of the present invention is to provide an optical modulation device, particularly a liquid crystal-optical shutter eliminating the above-mentioned problems.

Another object of the present invention is to provide a liquid crystal-optical shutter suitable for a time-sharing driving method.

The present invention is characterized in that there is provided an electrode matrix comprising two electrode groups oppositely spaced from each other, each comprising a plurality of elongated or stripe-form electrodes, the two electrode groups being arranged so as to intersect with each other to form a matrix, thereby making it possible to operate a liquid crystal-optical shutter by making use of a driving method wherein one electrode group is assigned to serve as a row electrode (common electrode) thereby to apply a voltage to each row electrode in a time-sharing manner. An electrode plate on which the row electrodes are formed comprises a metallic light shielding mask on the row electrodes in an area except for the section serving as a shutter opening, and a colored insulating film is formed between the row electrodes.

DESCRIPTION OF THE PREFERRED EMBODIMENTS

Figure 2:
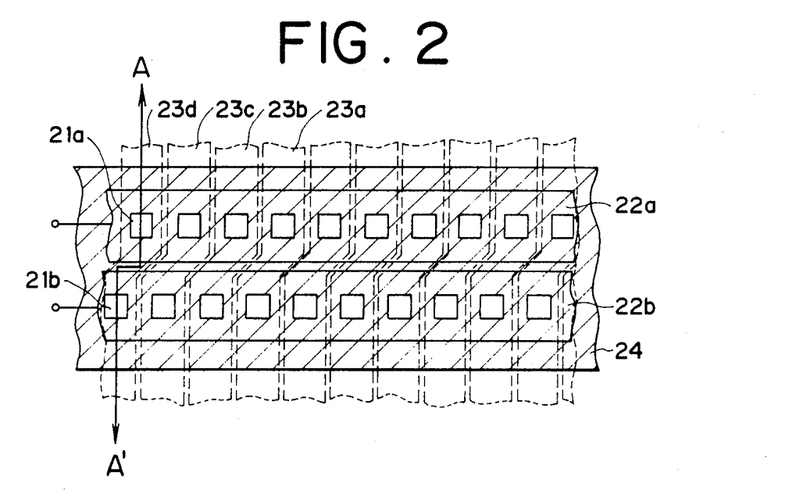
FIG. 2 is a plan view illustrating a liquid crystal-optical shutter according to the present invention.

A liquid crystal-optical shutter according to the present invention is embodied, for instance, as shown in FIG. 2. A row electrode (common electrode) plate used for the liquid crystal-optical shutter is embodied as shown in FIG. 3.

Figure 3:
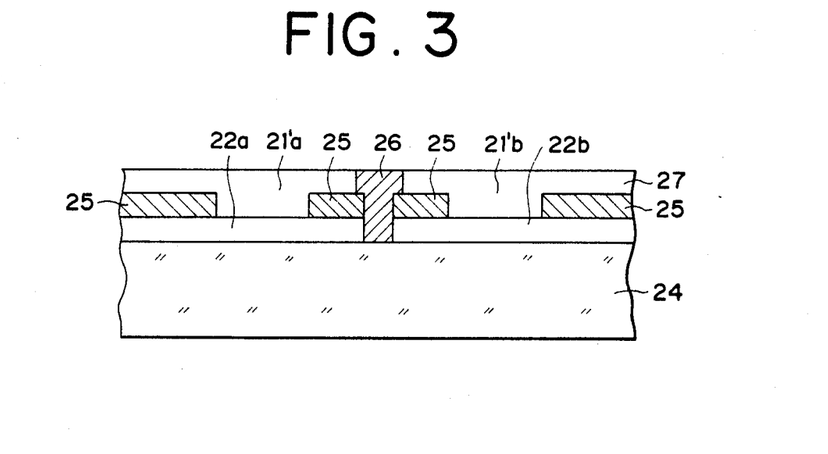
FIGS. 3 and 4 are, respectively, a cross-sectional view taken along the line A—A' of an electrode plate of the liquid crystal-optical shutter shown in FIG. 2.
Figure 4:
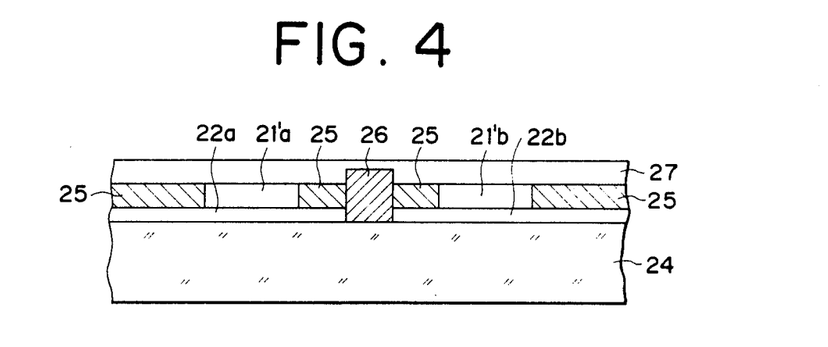

The shutter shown in FIGS. 2, 3 and 4 is such that a plurality of shutter openings 21 (21a, 21b, . . . ) are arranged in a staggered fashion and located at intersecting points of the row electrodes 22a and 22b and signal electrodes 23 (23a, 23b, 23c, 23d, . . . ).

The liquid crystal-optical shutter in this embodiment comprises a row electrode plate 24 (e.g., made of glass, plastics and the like) on which row electrodes 22a and 22b are formed and metallic light shielding masks 25 are formed on the row electrodes 22a and 22b in sections except for sections 21' (21'a, 21'b) in which shutter openings 21 are formed. Further, a colored insulating film 26 is disposed between row electrodes 22a and 22b. In the figures, reference numeral 27 indicates an insulating film of a resin or the like.

Reference is made to a preferred example of the process for forming the row electrode plate shown in FIG. 3. It should be understood that row electrodes 22a and 22b which are made of a transparent conductive thin film and metallic light shielding masks have already been formed on the inner surface of the glass electrode plate 24. A film of polyvinyl alcohol (PVA) serving as an orientation-controlling film is formed thereon. In this example, a mixture of an aqueous solution of 10% of Gosenol (Nippon Gosei Kagaku Kogyo) EG-05, as PVA, and ammonium bichromate, as a photosensitizer, added thereto in a proportion of 5% with respect to the solid part of the PVA, is spin-coated onto the surface of the electrode plate 24 (6000 r.p.m., 10 seconds). Thereafter, the coating thus formed is heated at a temperature of about 60° C. for 15 minutes to form a uniform insulating film (precursor of 27 in FIG. 3).

Then, the PVA film is subjected to exposure for 10 to 15 seconds with the peripheral edge portion thereof being masked. The PVA film thus exposed is developed for 20 seconds to remove the peripheral edges (not shown) which have not been exposed. Thereafter, the PVA film thus developed is dried by blowing $N_2$ gas thereto, and then the PVA film thus dried is further heat-dried at a temperature of 800° C. for 5 minutes.

Then, a photoresist (FPPR+800, Fuji Yakuhin Kogyo K.K.) is spin-coated (2000 r.p.m., 10 seconds). Thereafter, the coating thus formed is heated at a temperature of 800° C. for 5 minutes to form a photoresist layer (not shown). Then, a mask is provided thereto so as to cover a section designated by reference numeral 26 in the figure. In this condition, the photoresist layer is exposed for 7 seconds, and then developed in a developer to selectively remove the photoresist layer in the section 26.

The PVA film on which the photoresist process is formed is immersed into a dye solution for 5 minutes to dye the PVA coating film which is not covered with the photoresist layer, thereby forming the colored insulating film 26. Herein, a dye selected from, for example, Sumifix Black ENS (Sumitomo Kagaku), Solopheny INGL (Ciba Geigy), Cibacet Grey NH (Ciba Geigy), etc., is dissolved in 2% aqueous solution of $NH_4OH$ to form a dye solution. If necessary, a predetermined concentration of color can be obtained by successive immersion in two or three kinds of dye solutions.

After being rinsed with pure water, the article is subjected to a finishing process, including removing of the remaining portion of the photoresist layer with methyl ethyl ketone, rinsing with isopropyl alcohol, vapor drying with carbon fluoride ($CF_4$, $C_6F_6$), baking (180° C., 15'), etc. Further, the orientation process e.g. the rubbing process is effected. Thus, a light shielding mask is completed wherein the intermediate or gap portion 26 between row electrodes 22a and 22b is colored opaque. The thickness of layers 26 and 27 is generally 100Å to 5000Å, preferably 500Å to 2000Å, the color concentration of the layer 26 is determined so that the rate of transmission of the light (e.g., for electrophotography) is less than 60%, preferably less than 40%.

A preferred example of the process for forming the row electrode plate shown in FIG. 4 is now explained. In FIG. 4, assuming that the row electrodes 22a and 22b, and the metallic light shielding masks 25 have already been formed on the inner surface of the electrode plate 24 of glass, a polyvinyl alcohol (PVA) film is formed thereon. The PVA film is obtained by spin-coating a mixture of an aqueous solution of 10% of Gosenol (Nippon Gosei Kagaku Kogyo) EG-05 with ammonium bichromate (a photosensitizer) proportion of 5% with respect to the solid part of the PVA onto the surface of the electrode plate 24 with a rotatory spiner (5000 r.p.m., 10 seconds), and heating the coating thus formed at a temperature of about 60° C. for 15 minutes.

Then, the PVA film is exposed for 10 to 15 seconds with a mask being aligned so that light is incident solely to the gap (corresponding to the portion 26) defined between the metal light shielding masks 25. Then, the development is effected for 30 seconds with pure water to remove the non-exposed portions. Thereafter, the PVA film is dried by blowing $N_2$ gas thereto and then further subjected to heat-drying at a temperature of 80° C. for five minutes.

The PVA film thus obtained is immersed into a dye solution for five minutes to dye the PVA film. Herein a dye selected, for example, from Sumifix Black ENS (Sumitomo Kagaku), Solopheny INGL (Ciba Geigy), Cibacet Grey NH (Ciba Geigy), etc., is dissolved in 2% aqueous solution of $NH_4OH$ to form a dye solution. If necessary, a predetermined color concentration is obtained by successive immersion in two or three kinds of dye solutions. Thus, the PVA film is colored to form a colored insulating film 26.

After being rinsed with pure water, the article is subjected to a finishing process including rinsing with isopropyl alcohol, vapour drying with carbon fluoride ($CF_4$, $C_6F_6$), baking (180° C., 15 min.) etc. Thus, a light shielding mask is completed, wherein the gap portion 26 is colored opaque.

On the surface of the light shielding mask, a coating agent obtained with 2.5% NMP (N-methyl pyrrolidone) solution of a polyamide precursor is spinner coated (SP-510, produced by Toray K.K.) (6000 r.p.m. 60 seconds) and is heated for 30 minutes to form the insulating film 27 of polyamide.

Thereafter, the polyamide film is removed at a sealing portion and an electrode terminal portion (e.g. by etching at a temperature of 60° C. for 10 minutes with alkali 10% aqueous solution). Then, the orientation direction of the liquid crystal molecule is determined by the horizontal orientation-controlling process by means of rubbing.

The metallic light shielding mask 25 is generally formed by vapor-deposition or plating of a refractive metal such as chromium, aluminum or silver followed by the photolithography process. The metal light shielding mask 25 thus formed has a thickness of about 300Å to 2000Å, when formed of chromium.

A liquid crystal-optical shutter can be constituted by combining the glass electrode plate on which light shielding mask is formed as stated above with a glass electrode plate provided with counter electrodes as used in the prior art and aranging a polarizing plate at the both sides of the electrode plates. In a liquid crystal-optical shutter thus constituted, most of slight quantity of light transmitting through the portion on which the voltage is not applied, as observed in the prior art, is absorbed by the colored mask, thereby preventing optical sensitization of the portion other than the data portion during the writing-in step. It is needless to say that the same effect will accrue even when the light shielding mask is formed on the counter electrodes. In this instance, it is possible to form a light shielding mask for covering a portion except for the portion corresponding to a pattern electrode. Further, a light shielding mask may be formed on both of the pattern electrode and the counter electrode.

According to the present invention, the light shielding mask may be formed between electrodes using an aqueous or hydrophilic resin film of insulating property as stated above through dying thereof. Accordingly, the light shielding mask can be easily fabricated at a very low cost. Because the light shielding mask also serves as an orientation mask, the structure is further simplified. In the present invention, a film of pigment phthalocyanine formed by, e.g., vapor-deposition may be used as a colored insulating film.

Figure 5:
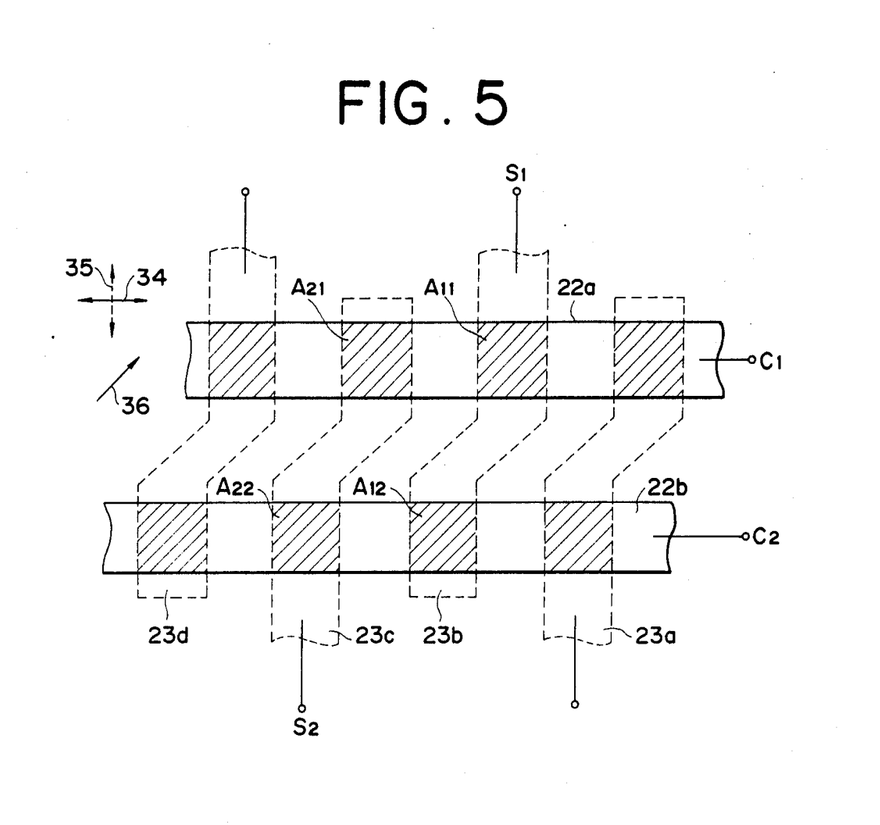
FIG. 5 is a plan view illustrating row electrodes and signal electrodes employed in the present invention.

The operation of a liquid crystal-optical shutter array having one-half time-sharing electrode structure is now explained as an example of the structure as shown in FIGS. 2 and 3. FIG. 5 is a partly enlarged view of a schematic illustration of an electrode arrangement of an electrode array as shown in FIG. 2. In the array shown in FIG. 5, two row electrodes 22a and 22b are arranged on a first electrode plate. On a second electrode member opposite thereto, signal electrodes 23 (23a, 23b, 23c, 23d . . . ) are arranged so as to intersect with the two row electrodes 22a and 22b. The intersecting points designated by the row electrodes 22a and 22b and the signal electrodes 23 are shown by oblique lines. The crossing points thus disposed in a staggered arrangement are considered as openings of the liquid crystal-optical shutter array and will be simply called "opening", hereinafter.

Polarizing plates are disposed on the outside of the first and second electrode plates, respectively, and arranged in the relationship of cross nicols i.e., with their polarizing directions substantially perpendicular to each other as indicated by arrows 34 and 35. To the inner wall surface of the first and the second electrode plates, orientation-contolling treatment such as rubbing is applied in such a manner that the P type liquid crystal interposed therebetween is initially oriented in a direction as indicated by an arrow 36 (an angle of about 45° with respect to both of the polarizing directions of the polarizing plates).

For the brevity of the following description, the openings $A_{11}$ and $A_{21}$ correspondingly located on the row electrode 22a and the openings $A_{12}$ and $A_{22}$ correspondingly located on the row electrode 22b are taken as examples. The operation will be described with reference to the openings $A_{11}$, $A_{21}$, $A_{12}$ and $A_{22}$.

Figure 6:
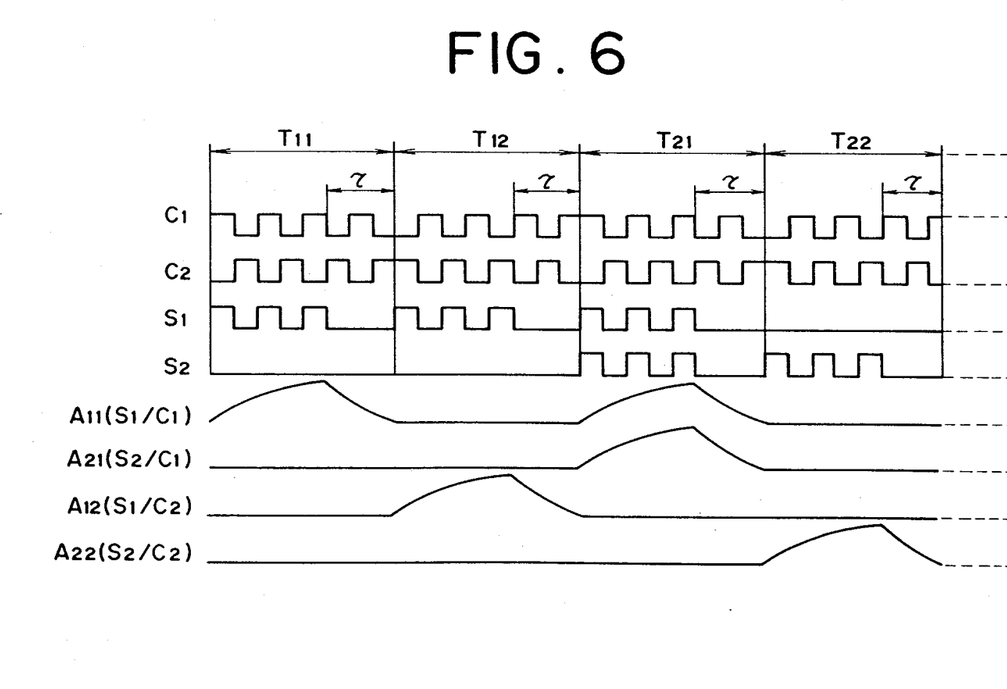
FIG. 6 is a time chart along which a liquid crystal-optical shutter of the invention is operated.

FIG. 6 shows a time chart used in a method of driving a shutter array having an electrode arrangement as shown in FIG. 5 according to the present invention. In FIG. 6, $T_{11}$, $T_{21}$, $T_{31}$ . . . denote time intervals during which openings correspondingly located on the row electrode 22a are active (operative), while openings correspondingly located on the row electrode 22b are all inactive (inoperative). In contrast, $T_{12}$, $T_{22}$, $T_{32}$ . . . denote time intervals during which openings correspondingly located on the row electrode 22b are active, while openings correspondingly located on the row electrode 22a are inactive. Namely, at time intervals $T_{11}$, $T_{21}$, $T_{31}$ . . . , it is not permissible that signals $S_1$ and $S_2$ fed to signal electrodes 23b and 23c affect the operation of openings $A_{12}$ and $A_{22}$. Further, at time intervals $T_{12}$, $T_{22}$, $T_{32}$ . . . , it is not permissible that the same signals $S_1$ and $S_2$ affect the operation of openings $A_{11}$ and $A_{21}$. The present invention is significant in satisfying this requirement.

First, the operation of each opening at time intervals $T_{11}$, $T_{21}$, $T_{31}$ . . . is described. As illustrated in a time chart of FIG. 6, voltages $C_1$ and $C_2$ are applied to row electrodes 22a and 22b, respectively. The voltage $C_1$ has a reverse phase or antiphase relationship with respect to the voltage $C_2$. On the contrary, a voltage which is in phase with the voltage $C_1$ or a voltage which is kept to be a predetermined level is applied to signal electrodes 23b and 23c, whereby the on/off operation of the shutter is determined.

In this example, only the opening $A_{11}$ is placed in shutter off condition (where irradiated light can transmit) at a time interval $T_1$. In this example, it is noted that there is provided a time interval $\tau$ for applying a signal (off signal) causing an off condition to a signal electrode at the end portion of each time interval for addressing one line.

Reference is made to the fact that a time interval $T_1$, row openings $A_{12}$ and $A_{22}$ corresponding to the row electrode 22b are placed in shutter-off condition (where irradiated light is interrupted). The operation of the liquid crystal corresponding to the opening $A_{12}$ is determined by an electric field given by the voltage $C_2$ and the signal $S_1$. Since the voltage $C_2$ and the signal $S_1$ have antiphase relationship with each other, the liquid crystal layer corresponding to the opening $A_{12}$ is subjected to a strong electric field. Accordingly, as described with reference to the prior art, this condition is a condition where light is not transmitted (off condition). On the other hand, the operation of the liquid crystal corresponding to the row electrode $A_{22}$ is determined by an electric field given by the voltage $C_2$ and the signal $S_2$. However, since the signal $S_2$ is maintained a predetermined constant voltage level, a relatively strong electric field is also applied to the liquid crystal layer corresponding to the opening $A_{22}$ due to the voltage $C_2$, thus, resulting in off condition. On the other hand, the operation of the opening $A_{21}$ is determined by the signal voltage $S_2$ and the voltage $C_1$. Since the signal $S_2$ has a constant voltage level, a relatively strong electric field is applied to the liquid crystal layer corresponding to the opening $A_{21}$ due to the voltage $C_1$, thus resulting in off condition. Meanwhile, the operation of the opening $A_{11}$ is determined by the voltage $C_1$ and the signal $S_1$. However, since the signal $S_1$ and the voltage $C_1$ have the in-phase relationship, a voltage of zero or a relatively week electric field given by the absolute value $|C_1 - S_1|$ is applied to the liquid crystal layer corresponding to the opening $A_1$. Thus, there are produced the condition where light is transmitted (on condition). At a time interval $T_{21}$ during which the row of the same row electrodes 22a is addressed, it is exemplified that the row openings $A_{11}$ and $A_{21}$ are both placed in on condition. The row openings $A_{12}$ and $A_{22}$ are respectively placed in off condition due to a relatively strong electric field given by signal $S_1$ and $S_2$ and the voltage $C_2$.

In summary, at a time interval during which row electrode 22a is addressed, row openings correspondingly defined by the row electrode 22b are stably placed in off condition, independent of the condition of signals $S_1$ and $S_2$.

Reference is further made to the operation at time intervals $T_{12}, T_{22}, T_{32}...$ during which the row of the row electrode 22b is addressed. In this example, at a time interval $T_{12}$, only the row opening $A_{12}$ is placed in the on condition, and at a time interval $T_{22}$, only the row opening $A_{22}$ is placed in the on condition. At time intervals $T_{12}, T_{22}, T_{32}...$, the voltage $C_2$ has the antiphase relationship with respect to the voltage $C_1$. On the contrary, the signal voltage ($S_1, S_2$) is in-phase with the voltage $C_2$ or placed at a constant voltage level, whereby the on/off mode of the shutter is determined. With respect to openings $A_{11}$ and $A_{21}$ at time intervals $T_{11}, T_{21}, T_{31}...$, a relatively strong electric field is always applied to the liquid crystal layer corresponding thereto as has been explained with reference to the openings $A_{12}$ and $A_{22}$ at time intervals $T_{11}, T_{21}, T_{31}...$, whereby the off condition is maintained. On the contrary, the on/off condition of row openings $A_{12}$ and $A_{22}$ at time intervals $T_{12}, T_{22}, T_{32}...$ is selected depending on how the signal voltage ($S_1, S_2$) is applied, as previously described in connection with row electrodes $A_{11}$ and $A_{21}$ at time intervals $T_{11}, T_{21}, T_{31}...$ The time period $\tau$ provided at the end portion of each time intervals $T_{11}, T_{12}, T_{21}, T_{22}, T_{31}, T_{32}...$ allows all the openings to be uniformly placed in off condition. This is effected by maintaining the voltage level of signals $S_1$ and $S_2$ at constant. The addition of such an eliminating signal makes it possible to securely interrupt optical transmission from an opening which is to be subsequently placed in off condition.

A liquid crystal-optical shutter according to the present invention has an extremely high reliability. The liquid crystal-optical shutter has an advantage that the orientation of the liquid crystal is not disturbed even when subjected to a durability test at a temperature of 85° C. and a relative humidity of 85% for more than 1000 hours. Accordingly, the present invention can offer an extremely effective liquid crystal-optical shutter.

Figure 7:
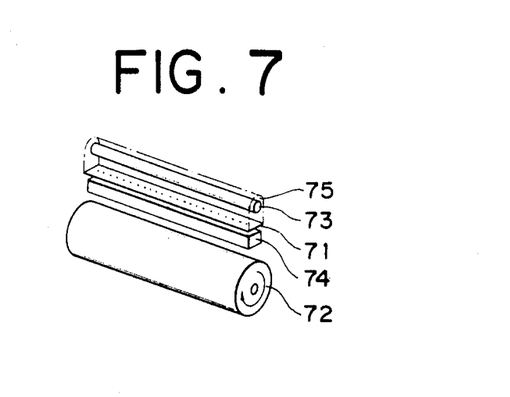
FIG. 7 is a perspective view schematically illustrating a printer head to which a liquid crystal-optical shutter of the invention is applied.

Referring to FIG. 7, there is shown a structure for providing an optical signal to a photosensitive member using a liquid crystal shutter array, wherein indication of an electric charger is omitted. Reference numeral 71 denotes a liquid crystal-optical shutter array, 72 a photosensitive drum, 73 a photo source (fluorescent lamp or the like), 74 SELFOC lens array, and 75 a condensing cover member. As stated before, by using a crystal-optical shutter array, it is possible to constitute a printer in a compact fashion in comparison with a conventional LBP (Laser Beam Printer).

What is claimed is:

1. An optical modulation device driven in a time-sharing manner, which comprises:
a pair of electrode plates oppositely spaced apart from each other, one of the pair of electrode plates having a plurality of signal electrodes thereon, and the other electrode plate having a plurality of row electrodes thereon arranged so as to intersect with the signal electrodes to form matrix intersecting points; and
a liquid crystal disposed between the signal electrodes and the row electrodes; wherein at least one of said pair of electrode plates is provided with a metallic light shielding mask on its electrodes except for the portions thereof forming shutter openings, and a colored insulating film is provided between the row electrodes.

2. An optical modulation device according to claim 1, wherein said metallic light shielding mask is formed of chromium, aluminum or silver.

3. An optical modulation device according to claim 1, wherein said metallic light shielding mask is formed of a chromium film having a thickness of 300Å to 2000Å.

4. An optical modulation device according to claim 1, wherein said colored insulating film is formed with a film of colored and hardened polyvinyl alcohol.

5. An optical modulation device according to claim 1, wherein an orientation-controlling film is respectively provided on the opposing surfaces of said signal electrodes and row electrodes.

6. An optical modulation device according to claim 5, wherein said orientation-controlling film is an insulating film to which horizontal orientation-controlling treatment is applied.

7. An optical modulation device according to claim 6, wherein said horizontal orientation-controlling treatment is the rubbing treatment.

8. An optical modulation device according to claim 6, wherein said insulating film is a film of polyamide resin or hardened polyvinyl alcohol.

9. An optical modulation device according to claim 1, wherein a polarizer is respectively disposed outside said signal and row electrodes.

10. An optical modulation device according to claim 9, wherein the polarizers are arranged in the relationship of cross nicols.

11. An optical modulation device according to claim 1, wherein said liquid crystal is a nematic liquid crystal having a positive dielectric anisotropy.

12. A time-sharing driving method for an optical modulation device which comprises:
a pair of electrode plates oppositely spaced apart from each other, one of the pair of electrode plates having a plurality of signal electrodes thereon, and the other electrode plate having a plurality of row electrodes thereon arranged so as to intersect with the signal electrodes to form matrix intersecting points; and
a liquid crystal disposed between the signal electrodes and the row electrodes; at least one of said pair of electrode plates being provided with a first light shielding mask on its electrodes except for the portions thereof forming shutter openings, and a second insulating and light-shielding film being provided between the row electrodes;
the time-sharing driving method comprising
applying a voltage to an addressed row electrode among the plurality of row electrodes, and
applying to a signal electrode a voltage which is in-phase with and at substantially the same level with the voltage applied to the addressed row electrode, thereby placing a selected matrix intersecting point in a light-transmitting condition.

13. A driving method for an optical modulation device according to claim 12, wherein the voltage applied to the addressed row electrode has the antiphase relationship with respect to a voltage applied to the other row electrodes.

14. A driving method for an optical modulation device according to claim 12, wherein there is provided a time interval for applying an off signal to a signal electrode within an addressing time interval.

15. A driving method for an optical modulation device according to claim 14, wherein said off signal is applied immediately before the address is shifted.

16. A driving method for an optical modulation device according to claim 12, wherein said first light shielding mask is a metallic light shielding mask formed on an electrode.

17. A driving method for an optical modulation device according to claim 16, wherein said metallic light shielding mask is formed with a film of chromium, aluminum or silver.

18. A driving method for an optical modulation device according to claim 16, wherein said metallic light shielding mask is formed with a chromium film having a thickness of 300Å to 2000Å.

19. A driving method for an optical modulation device according to claim 12, wherein said second light shielding mask is formed with a colored insulating film.

20. A driving method for an optical modulation device according to claim 19, wherein said insulating film is formed with a film of polyvinyl alcohol.

21. A driving method for an optical modulation device according to claim 12, wherein an orientation-controlling film is respectively provided on the opposing surfaces of said signal and row electrodes.

22. A driving method for an optical modulation device according to claim 21, wherein said orientation-controlling film is an insulating film to which a horizontal orientation-controlling treatment is applied.

23. A driving method for an optical modulation device according to claim 22, wherein said horizontal orientation-controlling treatment is the rubbing treatment.

24. A driving method for an optical modulation device according to claim 22, wherein said insulating film is a film of polyamide resin or hardened polyvinyl alcohol.

25. A driving method for an optical modulation device according to claim 12, wherein a polarizer is respectively disposed at the outsides of said signal and row electrodes.

26. A driving method for an optical modulation device according to claim 25, wherein said polarizers are arranged in the relationship of cross nicols.

27. A driving method for an optical modulation device according to claim 12, wherein said liquid crystal is a nematic liquid crystal having a positive dielectric anisotropy.

* * * * *

UNITED STATES PATENT AND TRADEMARK OFFICE
CERTIFICATE OF CORRECTION

PATENT NO. : 4,569,574

DATED : February 11, 1986

INVENTOR(S) : YUICHI MASAKI, ET AL.

It is certified that error appears in the above-identified patent and that said Letters Patent is hereby corrected as shown below:

```
In the Abstract, line 5, "electrode the plates" should be
                        --the electrode plates--.
Column  1, line 26, "There is no" should be --There are no--.
Column  1, line 50, "denisty" should be --density--.
Column  4, line 36, "vapour" should be --vapor--.
Column  4, line 63, "aranging" should be --arranging--.
Column  6, line 53, "week" should be --weak--.
Column  6, line 55, "there are produced" should be --there is
                    produced--.
Column  7, line 47, "74 SELFOC" should be --74 a SELFOC--.
Column  8, line 12, "opposing" should be --opposite--.
Column  9, line 23, "opposing" should be --opposite--.
```

Signed and Sealed this

Sixth Day of January, 1987

Attest:

DONALD J. QUIGG

Attesting Officer

Commissioner of Patents and Trademarks